March 26, 1940.  R. DE LAMPRECHT  2,194,887
METHOD OF INCREASING THE COMBUSTIBILITY OF HYDROCARBON FUELS
Filed June 15, 1938
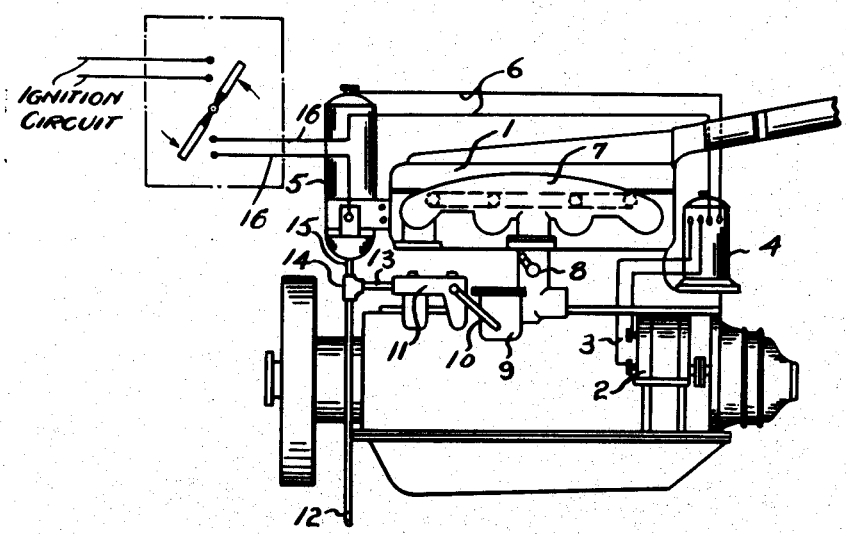
Inventor
Rodolphe De Lamprecht
By Albert E. Dieterich
and
Theodore H. Rutley
Attorneys Patented Mar. 26, 1940

2,194,887

UNITED STATES PATENT OFFICE 2,194,887

METHOD OF INCREASING THE COMBUSTIBILITY OF HYDROCARBON FUELS

Rodolphe de Lamprecht, Santa Monica, Calif.

Application June 15, 1938, Serial No. 213,949

5 Claims. (Cl. 123—119)

This invention relates to a method of increasing the combustibility of liquid hydrocarbon fuels, and more specifically gasoline, for the purpose of generally increasing the efficiency and power when used in internal combustion engines, and particularly those of automobiles and airplanes.

A particular object of my invention is to secure economy of operation of an automobile by increasing the mileage that may be obtained from a given quantity of fuel.

My invention relates to increasing the energy of the liquid fuel prior to its entrance into the carburetor by increasing the combustibility of the fuel through the introduction of ozone.

I am aware that a number of patents have been granted covering the use of ozone in internal combustion engines for increasing the power thereof, but such patents have had principally for their object the application of ozone to the air intake or manifold of the engine, and amongst such patents are to be found United States Patents Nos. 1,257,053; 1,459,306; 1,529,351; 1,680,537; 1,802,729 and 1,982,484.

All of the above patents cover some form or type of ozone-generating means and the application of the ozone directly to the indrawn airstream of the carburetor or the air in the intake manifold.

Not one of the above patents touches upon or teaches the increasing of the energy of the liquid fuel by treatment through the introduction of ozone to the fuel line.

As the result of recent experiments and tests, I have definitely proven that I can increase the energy and conserve the fuel by increasing the combustibility of it by introducing ozone directly into the liquid fuel, because both the aliphatic and aromatic hydrocarbons have been found to possess the properties of absorbing ozone (possibly dissolving it) which is not the case with oxygen, as experiments have indicated.

My invention may be carried out by the use of very simple apparatus which is diagrammatically illustrated in the accompanying drawing forming part of this application, and in which:

Figure 1 is a diagrammatical illustration of an internal combustion engine fitted with ozone-generating apparatus which is connected into the fuel line ahead of the fuel pump.

In this drawing like numerals indicate like parts and the numeral 1 indicates an internal combustion motor having a magneto 2 the leads 3 of which are connected to a transformer 4 which, in turn, is connected to an ozonator 5 by the leads 6.

One of the leads 6 is broken at 16 so that it may be connected into the ignition switch of the engine whereby, when the engine is started up, the ozonator 5 is cut in and caused to function to generate ozone.

The motor 1 has an intake manifold 7 connected to a carburetor 8 having a bowl 9 which is connected by the duct 10 to a fuel pump 11. One end of the pump 11 is connected to the fuel line 12 by the nipple 13 from the T 14. The top of the T is directly connected by the nipple 15 to the bottom of the ozonator 5 in which ozone is generated.

When the motor 1 is started up, the fuel pump 11 is caused to function to pump oil into the bowl 9 of the carburetor and this action of the pump sets up a flow and suction in the fuel line 12 and upon the bottom of the tank of the ozonator 5, sufficient to draw ozone into the fuel line where it is intimately mixed with the fuel in passing through the pump whereby the hydrocarbon fuels absorb the ozone and thereby become energized through the absorption of the oxygen content of the ozone.

Actual tests of ozone treated hydrocarbon fuels in an automobile have shown quicker starting and greater acceleration of the engine over ordinary fuels used and an increase in mileage of approximately forty per cent from a given quantity of fuel, which is equivalent to a saving of forty per cent of ordinary fuel used.

In actual tests carried out upon airplanes I have, by the use of ozone treated fuels, effected savings aggregating twenty-five per cent of the fuel used under ordinary conditions.

Having now described my invention and the nature of same, what I claim and desire to be protected in, by Letters Patent, is:

1. The method of increasing the combustibility of aliphatic or aromatic hydrocarbon fuel for an internal combustion engine which has a carburetor, a fuel line and a fuel pump for drawing fuel from the fuel line and delivering it to the carburetor, said method consisting in introducing ozone directly into the fuel passing through the fuel line under the suction influence of said pump, and then delivering the energized hydrocarbon fuel to the carburetor to be atomized before passing it to the engine.

2. The method of energizing liquid hydrocarbon fuel for an internal combustion engine which has a carburetor, a fuel supply line and a pump for drawing fuel through the line and passing it to the carburetor to be there atomized and mixed with air before passage to the engine, said method comprising the introduction of ozone into the fuel supply line at the suction side of the pump.

3. An internal combustion engine, a fuel pump, a fuel line connected to the intake side of the pump, an ozonator connected to said fuel line so that ozone is intimately mixed with the fuel in passing through the pump to the engine.

4. An internal combustion engine including an engine manifold, a carburetor connected thereto, an ozonator and a fuel line, a pump situated between said carburetor and said ozonator and fuel line, the pump serving to draw ozone into the fuel line where it becomes intimately mixed with the fuel before passing into the carburetor and engine manifold.

5. An internal combustion engine having a magneto, an ozonator and a fuel line, a transformer, leads extending therefrom to said magneto and to said ozonator, a pump communicating with said carburetor and connected with said ozonator and said fuel line, and an ignition switch, leads extending to the ignition switch so that when the engine is started up ozone will be generated and drawn into the fuel line where it becomes intimately mixed with the fuel in passing through the pump to the carburetor and engine manifold.

RODOLPHE DE LAMPRECHT.